US012211512B2

(12) United States Patent
Kupryjanow et al.

(10) Patent No.: US 12,211,512 B2
(45) Date of Patent: Jan. 28, 2025

(54) NOISE REDUCTION USING SPECIFIC DISTURBANCE MODELS

(71) Applicant: INTEL CORPORATION, Santa Clara, CA (US)

(72) Inventors: Adam Kupryjanow, Gdansk (PL); Kuba Lopatka, Gdansk (PL); Tomasz Szmelczynski, Gdansk (PL)

(73) Assignee: INTEL CORPORAITON, Santa Clara, CA (US)

( * ) Notice: Subject to any disclaimer, the term of this patent is extended or adjusted under 35 U.S.C. 154(b) by 890 days.

(21) Appl. No.: 16/786,471

(22) Filed: Feb. 10, 2020

(65) Prior Publication Data

US 2020/0184987 A1 Jun. 11, 2020

(51) Int. Cl.
  *G10L 21/0224* (2013.01)
  *G10L 15/16* (2006.01)
  (Continued)

(52) U.S. Cl.
  CPC .......... *G10L 21/0224* (2013.01); *G10L 15/16* (2013.01); *G10L 21/0232* (2013.01); *G10L 2021/02166* (2013.01)

(58) Field of Classification Search
  CPC ..... G10L 21/00; G10L 21/02; G10L 21/0208; G10L 21/02082; G10L 21/02085; G10L 21/02087; G10L 21/02166; G10L 21/0224; G10L 21/0232; G10L 21/0316; G10L 15/00; G10L 15/08; G10L 15/16; G10L 15/20; G10L 15/22; G10L 25/27; G10L 25/30; G10L 25/78; G10L 25/783; G10L 25/81; G10L 25/84; G06N 3/02; G06N 3/08; G06N 3/08; G06N 3/0208; G06N 3/02082; G06N 3/02085; G06N 3/02087;
  (Continued)

(56) References Cited

U.S. PATENT DOCUMENTS 7,058,572 B1 * 6/2006 Nemer ................ G10L 21/0208
704/226
9,185,506 B1 * 11/2015 Deng .................... G10K 11/175
(Continued)

OTHER PUBLICATIONS

Barchiesi, et al. "Acoustic Scene Classification:Classifying environments from the sounds they produce" IEEE Signal Processing Magazine, 32 (3) pp. 16-34, May 2015.
(Continued)

*Primary Examiner* — Hai Phan
*Assistant Examiner* — Alexander Joongie Kim
(74) *Attorney, Agent, or Firm* — Hanley, Flight & Zimmerman, LLC (57) ABSTRACT

An example apparatus for reducing to reduce noise in audio includes a preprocessor to receive audio input from a microphone and preprocess the audio input to generate preprocessed audio. The apparatus also includes an acoustic event detector to detect an acoustic event corresponding to a disturbance in the preprocessed audio. The apparatus further includes a noise reduction model selector to select a specific disturbance model based on the detected acoustic event. The apparatus further includes a noise suppressor to attenuate components related to the disturbance in the preprocessed audio using the selected specific disturbance model to generate enhanced audio with suppressed noise.

26 Claims, 6 Drawing Sheets

(51) Int. Cl.
 *G10L 21/0216* (2013.01)
 *G10L 21/0232* (2013.01)
(58) Field of Classification Search
 CPC ............ G06N 3/02166; G06N 3/0224; G06N 3/0232; G06N 3/0316
 See application file for complete search history.

(56) References Cited

U.S. PATENT DOCUMENTS

| | | | |
|---|---|---|---|
| 10,522,167 B1* | 12/2019 | Ayrapetian | G10L 17/18 |
| 2016/0092766 A1* | 3/2016 | Sainath | G06N 3/048 706/20 |
| 2017/0084289 A1* | 3/2017 | Yoo | G10L 25/84 |
| 2018/0239377 A1* | 8/2018 | Ovadia | G08B 25/14 |
| 2019/0035381 A1* | 1/2019 | Maziewski | H04R 29/001 |
| 2019/0043489 A1 | 2/2019 | Lopatka et al. | |
| 2019/0043491 A1 | 2/2019 | Kupryjanow et al. | |
| 2019/0043494 A1* | 2/2019 | Czyryba | G10L 15/08 |
| 2019/0066713 A1* | 2/2019 | Mesgarani | G10L 25/30 |
| 2019/0318755 A1* | 10/2019 | Tashev | G06N 3/045 |
| 2019/0394581 A1* | 12/2019 | De Vries | H04R 25/604 |
| 2020/0211566 A1* | 7/2020 | Kang | G06N 3/08 |
| 2020/0388297 A1* | 12/2020 | Rudberg | G10L 25/84 |
| 2021/0250722 A1* | 8/2021 | Giurda | H04R 3/005 |
| 2022/0223144 A1* | 7/2022 | Sun | G10L 15/16 |

OTHER PUBLICATIONS

Choi, et al. "Phase-aware Speech Enhancement with Deep Complex U-Net", arXiv.org > cs > arXiv:1903.03107, (Submitted on Mar. 7, 2019 (v1), last revised Apr. 2, 2019 (this version, v2)) Cornell, University, 20 pages.

Higuchi, et al. "Robust MVDR Beamforming Using Time-Frequency Masks for Online/Offline ASR in Noise"; Published in: 2016 IEEE International Conference on Acoustics, Speech and Signal Processing (ICASSP), Mar. 2016, Shanghai China, 5 pages.

* cited by examiner

NOISE REDUCTION USING SPECIFIC DISTURBANCE MODELS

BACKGROUND

Noise can be reduced to improve the quality of audio including sounds such as speech. For example, noise reduction can be used for an improved listening experience or speech recognition.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Various techniques may be used to reduce noise in audio. For example, techniques such as noise reduction, beamforming, or blind source separation can be used to reduce noise in input audio. However, beamforming or blind source separation algorithms try to detect and remove distortion in a continuous manner without any breaks. Thus, the computation complexity of such processing is constant. Moreover, due to unknown noise profiles, it may be hard to remove specific types of noise such as the cries of a baby, since the audio profile of a baby crying may be close to human speech.

The present disclosure relates generally to techniques for reducing noise in audio. Specifically, the techniques described herein include an apparatus, method and system for reducing noise in audio using specific disturbance models. An example apparatus includes a preprocessor to receive audio input from a microphone and preprocess the audio input to generate preprocessed audio. The apparatus also includes an acoustic event detector to detect an acoustic event corresponding to a disturbance in the preprocessed audio. The apparatus further includes a noise reduction model selector to select a specific disturbance model based on the detected acoustic event. The apparatus also further includes a noise suppressor to attenuate components related to the disturbance in the preprocessed audio using the selected specific disturbance model to generate an enhanced audio with suppressed noise.

The techniques described herein thus enable improved telecommunication. For example, the techniques described herein can be used during voice over Internet protocol (VoIP) calls to remove unwanted events from the calls on both capture and playback sides. The techniques described herein can also reduce the power consumption of systems where a speech interface is enabled by only enabling the computationally intensive speech enhancement algorithm when there is a disturbing event detected.

In addition, by using a specific model trained to suppress the selected disturbance a superior quality of noise reduction is achieved and the user experience is improved when compared to traditional noise reduction techniques. In an experiment calculating a mean squared error of mask estimation, the use of a specified model was shown to perform better than a generalized noise reduction model. The test data used were 198 speech samples mixed with baby crying sounds. A time-frequency mask (TFM)-based network using specific disturbance models was shown to be able to better match the ideal mask, which perfectly separates the speech from the disturbing sound. In general, the specified model that was trained to discriminate between speech and baby cry achieves much smaller errors than a general model trained on a wide range of noises.

Moreover, the techniques described herein also enable detection and removal of different types of overlapping noises by use of a cascading method in which the different types of overlapping noises are iteratively removed from an audio input until no further noises are detected.

Figure 1:
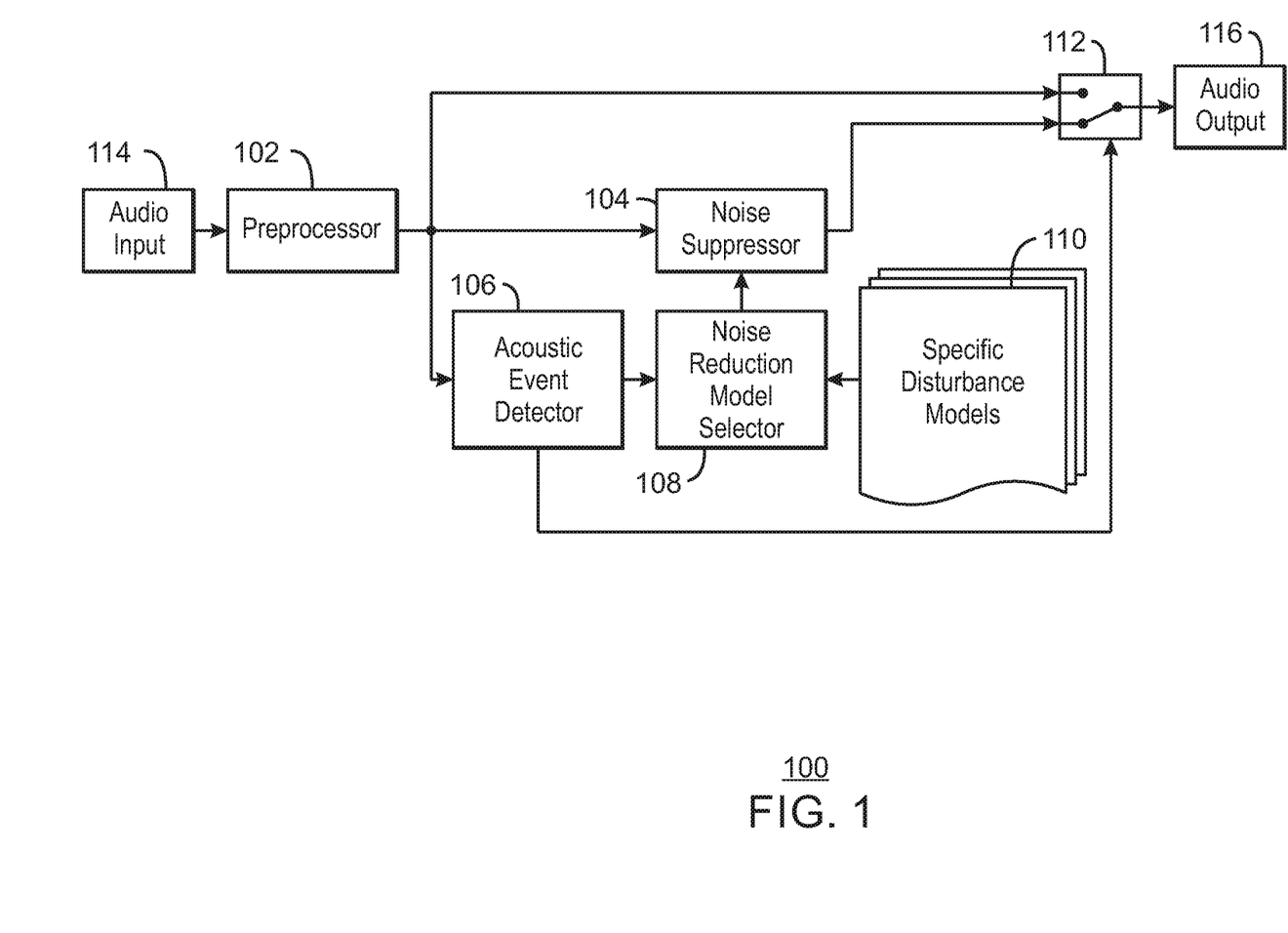
FIG. 1 is a block diagram illustrating an example system for reducing noise in audio using specific disturbance models.

FIG. 1 is a block diagram illustrating an example system for reducing noise in audio using specific disturbance models. The example system 100 can be implemented in the computing device 500 in FIG. 5 using the method 400 of FIG. 4.

The example system 100 includes a preprocessor 102. The system 100 also includes a noise suppressor 104 communicatively coupled to the preprocessor 102. The system further includes an acoustic event detector 106 communicatively coupled to the preprocessor 102. The system 100 also further includes a noise reducer and model selector 108 communicatively coupled to the noise suppressor 104 and the acoustic event detector 106. The system 100 also includes a set of specific disturbance models 110. For example, the specific disturbance models 110 may be stored in a storage communicatively coupled to the noise reducer and model selector 108. The system 100 also includes a switch 112 communicatively coupled to the preprocessor 102, the noise suppressor 104, and the acoustic event detector 106.

In the example of FIG. 1, system 100 can receive audio input 114 and generate audio output 116. For example, the system 100 may be a speech or voice preprocessing pipeline. In some examples, the audio input 114 may be received from one or more microphones included in the system 100. For example, the system 100 may be implemented on an audio capture device. In some examples, the audio input 114 may be received from an audio capture device via a network or other connection. For example, the system 100 may be implemented on a playback device. In various examples, the audio input 114 may include any number of disturbances, such as dog barking, baby crying, wind noise, music playing, etc. Generally, as used herein, noise is one or more disturbances in the audio input. Noise may be an undesirable audio that distorts the desired audio in the audio input 116. For example, the desired audio may be speech. The audio output 116 can be preprocessed audio in the case that a portion of audio input 114 does not contain disturbance. If any portion of the audio input 114 contains a disturbance, then such disturbances can be detected and the audio output 116 may be an enhanced audio that has any disturbance suppressed.

As shown in FIG. 1, the system is a speech processing pipeline. In some examples, the audio input 114 originating from one or more microphones or received over a network is processed by a preprocessor 102. For example, the preprocessor 102 can be a standard preprocessing pipeline that performs a combination of the typical signal processing operations. In various examples, such operations may include reverb reduction, gain compensation, direct current (DC) removal, and beamforming, among other possible operations. For example, gain may be performed in order to increase the amplitude of an audio input. DC removal may be performed to remove DC bias in the audio input to bring the center of the recorded waveform to 0. Beamforming may be used to extract a sound source of speech in an environment and improve the audio input by simultaneously increasing the speech in the audio input and decreasing noise from other sources. For example, beamforming may use a delay in the time of arrival of speech at a number of microphones in order to infer a location of the source of speech and filter out audio input from other sources. For example, the audio input from the other sources may be considered as noise.

In various examples, the acoustic event detector 106 can detect specific disturbing noises, referred to herein as disturbances, present in the background of the audio input 114. The acoustic event detector 106 can also recognize the type of the disturbance and thus provide a context awareness for the system 100 to be used by the noise reduction model selector 108 and the switch 112 as described herein. For example, the type of the disturbance may be a dog barking, baby crying, wind noise, music playing, etc. In various examples, the acoustic event detector 106 is trained to react to predefined disturbances, such as baby cry or dog barking. In one example, the acoustic event detector 106 is based on a deep neural network. For example, the acoustic event detector 106 may include an acoustic frontend that calculates the features from the input data. The acoustic event detector 106 may also include a classifier that produces scores from the feature frames. The acoustic event detector 106 may also further include a backend that analyzes the neural network scores and makes a determination as to whether portions of the audio input corresponding to the scores are classified into one of the pre-defined disturbances. For example, the classifier may be a trained deep neural network. As one example, the acoustic event detector 106 may be implemented using a frontend that is not neural. For example, the frontend of the acoustic event detector 106 may include a fast Fourier transform (FFT) and filters in the frequency domain. In this example, the classifier may be a neural net. The backend may be not neural. For example, the backend may perform basic operations such as calculating a running average and comparing the running average with a threshold. As another example, the acoustic event detector 106 may be implemented as a neural network that includes lower layers to perform feature extraction. For example, the lower layers may be convolutional layers. The neural network may include middle layers to classify the features calculated by the lower layers. The neural network may include upper layers that make the determination. For example, the determination may be made using max pooling or attention pooling techniques.

In various examples, the processing flow of the acoustic event detector 106 can divided into two parts, including a first part dedicated for impulsive events and a second part dedicated for continuous events. For example, impulsive events may include sounds that are related to sudden perturbation of the acoustic field. The typical length of an impulsive event may be in the range of zero to 1 second. Examples of impulsive events may include glass breaking, gunshots, door knocks, dog barks, etc. In various examples, continuous events may be sounds that can be sustained for a longer time. For example, continuous events may be in the range of a few seconds or more. Continuous events may have harmonic structures. For example, continuous events may include such sounds like baby cries, screams, alarms, phones ringing, etc. In various examples, impulsive and continuous sounds maybe analyzed using different signal analysis units.

In some examples, two separate feature frontends may be employed in the acoustic event detector 106. For example, one feature frontend may be a continuous frontend dedicated to detection of continuous events and an impulsive frontend dedicated to detection of impulsive events. In various examples, the feature frontends may include linear prediction features, wavelet features, finite impulse response (FIR) filters, among other features. In some examples, the feature frontends may be implemented as a convolutional frontend or bottleneck frontend embedded in the neural net topology. In various examples, the feature frontends may employ filterbank features. For example, logarithmic filterbanks may be used for continuous events, while linear filterbanks may be used for impulsive events. In some examples, for the continuous frontend, a Discrete Cosine Transform and logarithm may be applied to the filterbank features to obtain Mel-Frequency Cepstral Coefficients (MFCCs). A difference between the processing of continuous frontend and the impulsive frontend may be in the splicing of feature frames. For example, to correctly describe continuous events, the continuous frontend may buffer features from a large time span. For example, the time span may be 0.75 second. For a frame rate of 100 hertz, this may result in 75 frames. In various examples, since impulsive and continuous sounds are described by different types of features, these different types of features may also be processed by separate classifiers. For example, the classifiers may process frames produced by the frontends and return posterior probabilities that the audio frame belongs to a target event class. Each of the classifiers may be a trained neural network. In some examples, the input to each of the neural network may be processed by a feature scaling unit that normalizes features to a zero mean and unit variance. In various examples, each of the classifiers may be implemented as a deep feed forward neural network (DNN). For example, each of the DNNs may include four to six affine layers. Each layer may include about 128 perceptrons. The layers of each DNN may fully connected, containing nodes that are connected to all nodes of subsequent layers. The input to each layer may be multiplied by layer weights shifted by a bias and then passed through an activation function. For example, the activation function may be implemented as a sigmoid function, or any other suitable activation function. As one example, the layer output y may be calculated using the equation:

$$y = f(Wx+b) \qquad \text{Eqn. 1}$$

In some examples, in order to more easily change DNN weights and biases, the whole network may be packed to a structure (blob) describing classifier topology. Such an approach may enable uploading new network coefficients without having to change the code responsible for inference.

The outputs of the classifiers may be processed in respective backend units. For example, a separate backend unit may be devoted to each detected event. Each backend unit may perform smoothing of the neural network output and a comparison with a threshold. Each of the backend units may process frames of a DNN and return a decision concerning detection of an acoustic event. For example, the received DNN scores may indicate the posterior probability that a sound belongs to a target event class, such as a particular disturbance. The backend unit may determine at which point an event is detected. In various examples, a comparison with a threshold may be performed in order to detect an acoustic event. In some examples, the threshold may be set based on a development set containing positive examples of events of interest and negative examples of other sounds. For example, the false rejection and false acceptance errors may be minimized. In some examples, the backend units may first perform smoothing and then observe how many times a smoothed score exceeds a threshold in a fixed window. For example, the window may be one second. An acoustic event may be detected in response to detecting that a threshold is exceeded a predetermined number of times. As one example, an acoustic event may be detected in response to detecting that the threshold is exceeded 10 times in a one second window.

In some examples, the acoustic event detector 106 can also detect the type of acoustic environment in which an audio input was captured, referred to herein as performing acoustic scene classification. For example, the type of acoustic environment may include music, inside the car, outdoor, quiet room, etc. In these examples, the feature frontend of the acoustic event detector 106 may be designed to capture more long-term properties of sounds. The outputs of the DNN classifier may also be directly related to posterior probabilities of the recognized acoustic scenes. Moreover, the backend of the acoustic event detector 106 may compute an average score of the acoustic scene over the analysis period rather than comparing the DNN output with the threshold. Such detected acoustic environments may also be treated as disturbances.

In response to detecting a disturbance, the noise reduction model selector 108 can select an appropriate noise reduction model. For example, the noise reduction model selector 108 can load a specific disturbance model 110 that is optimized for separating speech from the specific type of sound in the disturbance. In various examples, the specific disturbance model 110 can then be incorporated by the noise suppressor 104. The noise suppressor 104 can attenuate the components related to the disturbing sound using the specific disturbance model 110.

In various examples, the noise suppressor 104 reduces disturbing components in the audio input 114. For example, the noise suppressor 104 can reduce dog barking, music playing, engine noise etc. In some examples, the reduction of noise or the specific disturbances can be achieved using any known signal processing techniques. For example, the noise suppressor 104 can use time-frequency mask based speech enhancement combined with beamforming. As one example, the TFM based speech enhancement may be implemented by using a LSTM network that estimates a Time-Frequency Mask and denoising the signal via multiplication of the input and TFM. In some examples, the noise suppressor 104 can use a neural network-based spectral speech enhancement. For example, the neural network-based spectral speech enhancement can be a LSTM network that estimates a TFM and a denoised signal is obtained via multiplication of the input and TFM. In various examples, the noise suppressor 104 can use auto-encoders to perform neural network-based time domain speech enhancement. For example, auto-encoders such as WaveNet, released September 2016, or u-net, released May 2015, may be used. The network may be fed with audio signal chunks and the encoder-decoder layers transform a signal to a higher dimension. In various examples, the encoder-decoder typically may be based on 1 or 2-D convolution layer. In some examples, speech signal extraction may be performed in the feature domain.

In one example, the noise suppressor 104 of system 100 uses time-frequency masks. For example, the time-frequency masks may be inferred by a deep recurrent neural network. In various examples, the topology of the neural network may vary, but the neural network may contain at least one recurrent layer. For example, the input to the neural network may be a representation of the noisy speech X. In various examples, the noisy speech X can be a feature vector, a raw waveform, or a frame of spectral coefficients. The output of the network may be a vector M. For example, the vector M may include coordinates corresponding to the coordinates of X and denoting the probability of the coefficients of X representing speech. In some examples, the value 1 may mean that a component is recognized as speech. The value 0 may mean that a component is recognized as noise. For example, the noise may be a disturbing event, or disturbance. In various examples, the network is scored for all time steps. The scoring may result in a time-frequency mask (TFM). For example, a TFM estimator can generate the TF mask by inference via the trained deep recurrent neural network. In various examples, the TFM estimator can be replaced by or include some other neural network-based preprocessing. For example, the TFM estimator may be replaced with a U-Net, a WaveNet or a ConvTasNet, first released May 2019. In addition, a skip connection may be included between the input and the last layer of the neural network. The skip connection may enable a more fine-grained mask. Thus, the skip connection may enable the method to react more quickly to changes in the input.

In another example, the noise suppressor 104 may be a neural net trained to infer a disturbance time-frequency mask. For example, the value 1 in the disturbance time-frequency mask may indicate a component of the disturbing sound. Training a neural network to infer disturbance time-frequency masks is different than just inverting the speech TFM because the disturbances are often foreground sounds which overlap with speech but are not identical to the acoustic background. In the example of a disturbance of a baby crying, the disturbance TFM may indicate which time-frequency components belong to the baby cry sound. The noise suppressor 104 may then selectively attenuate these components.

As shown in FIG. 1, the audio output 116 when a disturbance is detected by the acoustic event detector 106 is the enhanced signal in which the disturbing sound is suppressed. The switch 112 can connect to the noise suppressor 104 to receive the enhanced signal in response to detecting the disturbance from the acoustic event detector 106. By using a specific disturbance model 110 trained to suppress the selected disturbance, the system 100 can achieve improved quality of noise reduction and thus improved user experience.

In various examples, if no disturbance is detected, then the switch 112 can switch back to receive audio directly from the preprocessor 102. For example, the noise suppressor 104 may increase power consumption when used. Thus, using the switch 112 that is controlled by the decision of the acoustic event detector 106, the costly operation of the noise suppressor 104 can be bypassed. For example, when there is no distinctive disturbance present in the background, the standard preprocessing by the preprocessor 102 may only be performed. Thus, the audio output 116 may be preprocessed audio from the preprocessor 102 in response to detecting no acoustic event in the preprocessed audio. In this manner, the system 100 may also achieve power saving during operation.

The system 100 may be used in various applications. For example, the system 100 may be used in a voice-over-IP (VoIP) application. In some examples, the system 100 may be used to control a home automation device with a set of predefined commands. In various examples, the system 100 may be used to provide speaker identification or speaker diarization with improved accuracy because disturbances are removed. For example, speaker diarization may be used to partition an input audio stream into homogeneous segments according to the speaker identity.

The diagram of FIG. 1 is not intended to indicate that the example system 100 is to include all of the components shown in FIG. 1. Rather, the example system 100 can be implemented using fewer or additional components not illustrated in FIG. 1 (e.g., additional preprocessors, noise suppressors, input audio, output audio, etc.).

Figure 2:
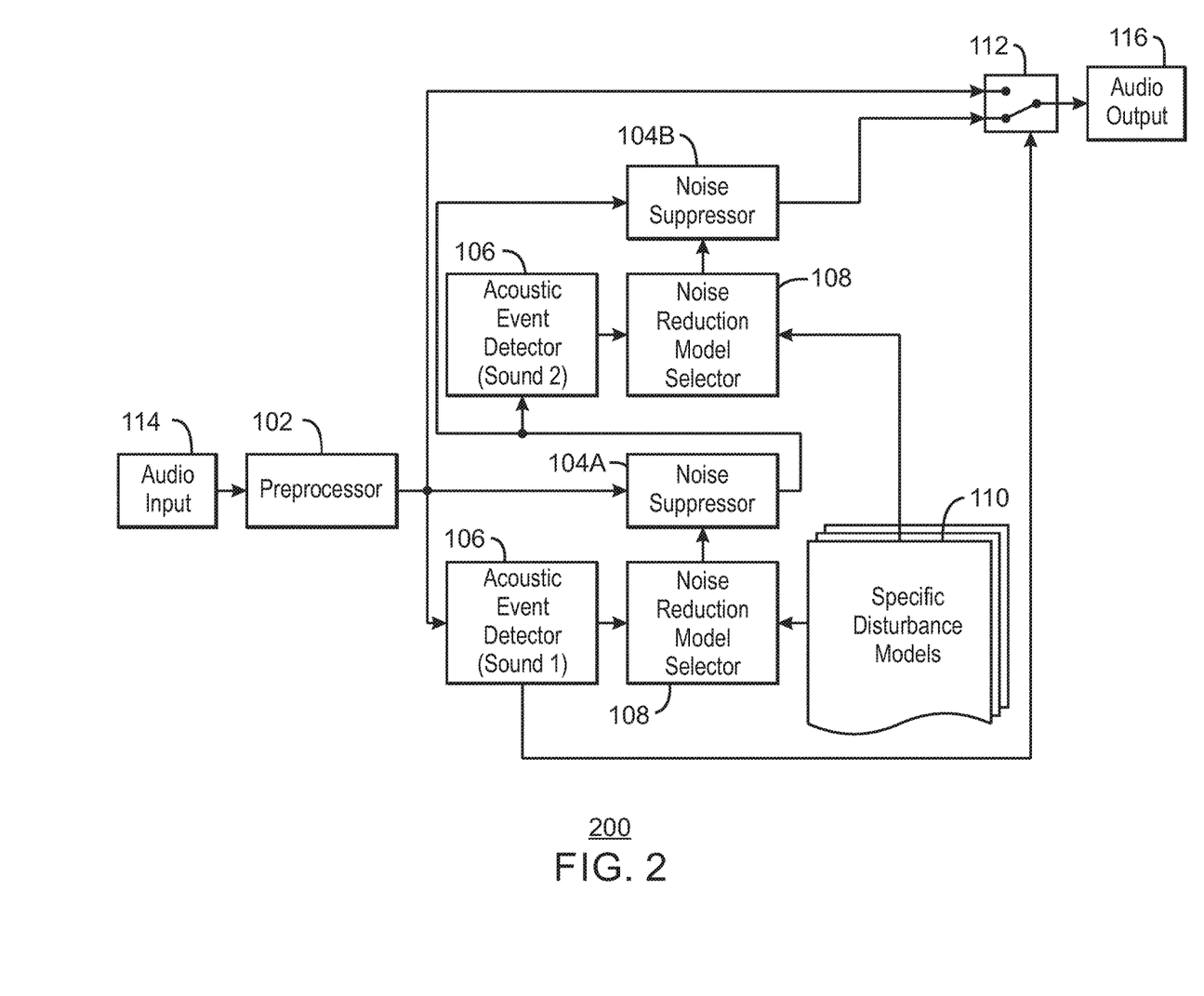
FIG. 2 is a block diagram illustrating another example system for reducing noise in audio using specific disturbance models.

FIG. 2 is a block diagram illustrating another example system for reducing noise in audio using specific disturbance models. The example system 200 can be implemented in the computing device 500 in FIG. 5 using the method 400 of FIG. 4.

The example system 200 includes similarly numbered elements of FIG. 1. In addition, the system 200 includes a first noise suppressor 104A and a second noise suppressor 104B. Although shown in multiple instances for convenience in order to demonstrate the processing of two disturbances, the acoustic event detectors 106 and the noise reduction model selectors 108 may actually be implemented as a single acoustic event detector 106 and noise reduction model selector 108 that process a first disturbance and then a second disturbance using two different specific disturbance models 110. For example, the disturbance suppression may be implemented as loops and detection of multiple sound types can be detected using a single acoustic event detector 106. Noise suppressors 104A and 104B thus may incorporate two different specific disturbance models 110. Thus, the noise suppressor model may be replicated to process the signal in a cascaded mode.

In the example of FIG. 2, multiple types of disturbing sounds can be suppressed in cascading mode. For example, the acoustic event detector 106 may first detect a first type of disturbance "Sound 1". As one example, the first disturbance may be a wind noise. Sound 1 may be suppressed by the noise suppressor 104A. The enhanced signal from the noise suppressor 104A is then looped back to the acoustic event detector 106. The acoustic event detector 106 may then then detect a second type of disturbance "Sound 2". For example, the second disturbance may be a dog barking. After "Sound 2" is suppressed by the noise suppressor 104B, the denoised signal can be passed back to detect more sound types. In various examples, the acoustic event detector 106 may detect additional disturbances to be suppressed. In various examples, when there are no more types of disturbances to detect, or nothing else is detected by the acoustic event detector 106, then the system 200 passes the enhanced signal with one or more suppressed disturbances to be output as audio output 116.

The diagram of FIG. 2 is not intended to indicate that the example system 200 is to include all of the components shown in FIG. 2. Rather, the example system 200 can be implemented using fewer or additional components not illustrated in FIG. 2 (e.g., additional disturbances, preprocessors, noise suppressors, acoustic event detectors, noise reducers, model selectors, specific disturbance models, audio input, audio output, etc.).

Figure 3:
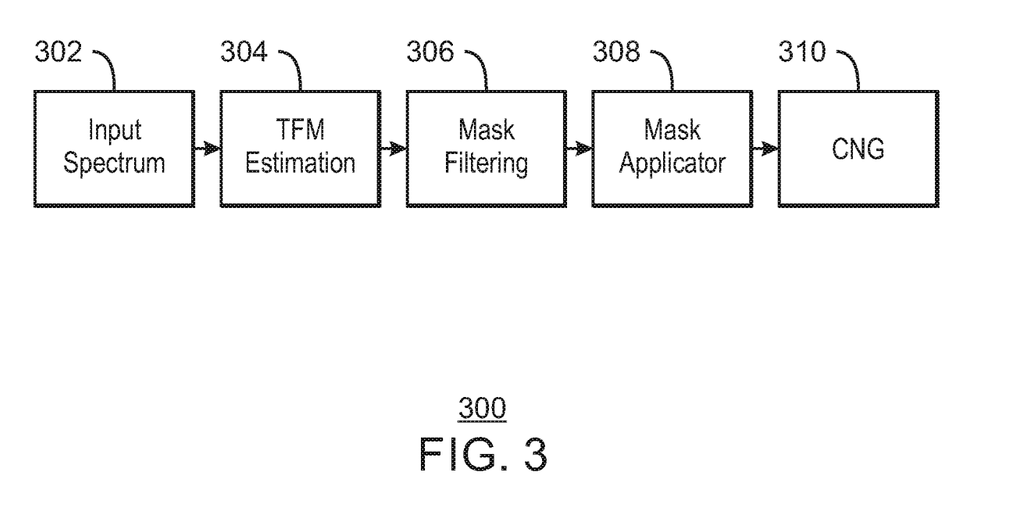
FIG. 3 is a process flow diagram illustrating an example noise suppressor for reducing noise in audio.

FIG. 3 is a process flow diagram illustrating an example noise suppressor for reducing noise in audio. The example noise suppressor 300 can be implemented in the system 100 and 200 of FIGS. 1 and 2, and the computing device 500 in FIG. 5, using the method 400 of FIG. 4. For example, the noise suppressor 300 may be the noise suppressor 104 of FIG. 1, 104A and 104B of FIG. 2, or the noise suppressor 536 of FIG. 5.

The example noise suppressor 300 includes an input spectrum 302 received at a time-frequency mask (TFM) estimation unit 304. The noise suppressor 300 further includes a mask filtering unit 306 communicatively coupled to the TFM estimation unit 304. The system also further includes a mask applicator 308 communicatively coupled to the mask filtering unit 306. The noise suppressor 300 also includes a comfort noise generator (CNG) 310 communicatively coupled to the mask applicator 308.

In various examples, to reduce artifacts and improve the subjective quality of the output audio signal over the input spectrum 302, one or more additional operations may be introduced into the preprocessor as shown in FIG. 3.

In various examples, the noise suppressor 300 may receive an input spectrum 302. For example, the input spectrum 302 may correspond to an audio input. In some examples, the input spectrum 302 may have been preprocessed using various preprocessing techniques. As one example, the input spectrum is a vector of K complex coefficients, which may be a result from passing a time window of the audio signal through Fourier Transform. In some examples, the Fourier Transform may be approximated by FFT algorithm. In one example, K=257, whereas the coefficient 0 is the DC offset, so only 256 coefficients may be passed through the TFM net. Before feeding into the TFM net, the complex coefficients are converted to magnitude and scaled. After stacking a number of time-windowed signals, the spectrum may be a 2D array with dimensions T×256, where T is the number of time steps.

The time-frequency mask (TFM) estimation unit 304 can perform a TFM estimation to generate a TFM. For example, the-frequency mask (TFM) estimation unit 304 may be a deep recurrent neural network trained to generate TFMs. In various examples, the frequency mask (TFM) estimation unit 304 may have at least one recurrent layer. The frequency mask (TFM) estimation unit 304 may also include a number of fully connected layers and LSTM layers.

In some examples, a mask filtering unit 306 filters the TFM. In various examples, the TFM may be filtered using a median filter and thresholding. For example, the TFM may be treated as an image and two dimensional median filter applied to the TFM. For example, the two dimensional median filter may be applied in time (between consecutive frame) and in frequency (between bins). In some examples, the size of filter kernel may be used as a tuning parameter. For example, when the median filter kernel is 3 by 3, then for particular time and frequency bin index, the TFM mask is calculated as median value of all neighboring values. As one example, for a +/−1 step in time and in frequency from this point a filter output may be calculated. After this operation all TFM values may be compared with a threshold. The TFM values below the threshold are set to zero. This threshold comparison may enable removal of errors from the estimated TFM mask.

In various examples, the mask applicator 308 applies the filtered TFM. For example, the mask applicator 308 can multiply the input spectrum 302 by the TFM.

A comfort noise generator (CNG) 310 can generate a comfort noise to be applied to an output magnitude spectrum. For example, the comfort noise may be used to hide imperfections caused by the mask filtering. In various examples, applying the mask to audio may lead to some audible distortions. The distortions may be caused by the fact that some spectral components are zeroed whereas others are kept. For example, these can be adjacent components. One specific type of such distortion is referred to as musical noise. Applying comfort noise may mask these kinds of artifacts.

The diagram of FIG. 3 is not intended to indicate that the example noise suppressor 300 is to include all of the components shown in FIG. 3. Rather, the example noise suppressor 300 can be implemented using fewer or additional components not illustrated in FIG. 3 (e.g., additional signals, masks, noise suppression techniques, filters, etc.).

Figure 4:
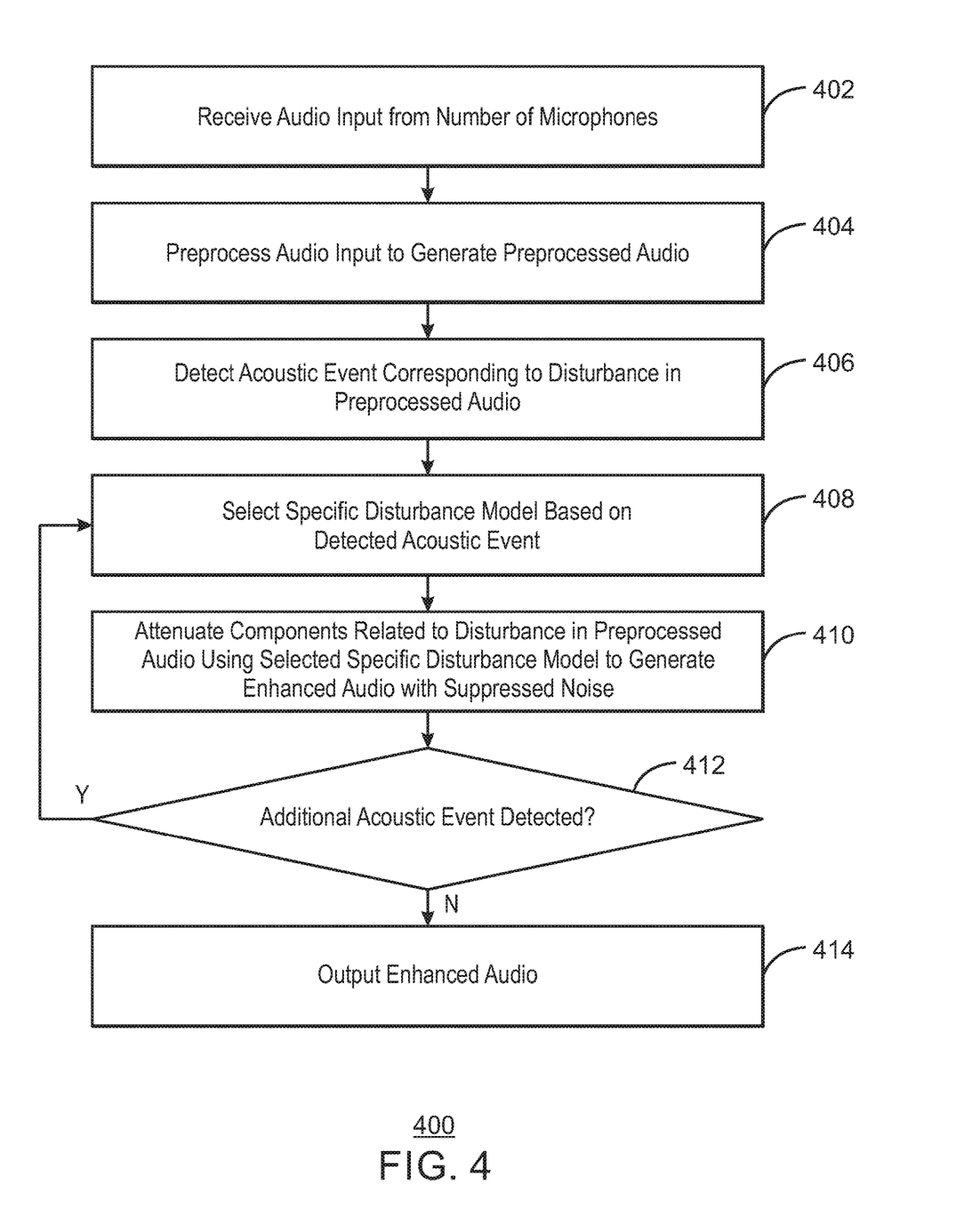
FIG. 4 is a flow chart illustrating a method for reducing noise in audio using specific disturbance models.

FIG. 4 is a flow chart illustrating a method for reducing noise in audio using specific disturbance models. The example method 400 and can be implemented using the systems 100-300 of FIGS. 1-3, the computing device 500 of FIG. 5, or in the computer readable media 600 of FIG. 6.

At block 402, a processor receives audio input from a number of microphones. For example, the audio input may include one or more disturbances in addition to speech. In various examples, the processor may receive the audio input via a network.

At block 404, the processor preprocesses the audio input to generate preprocessed audio. For example, the processor can perform a gain, DC removal, and beamforming of the audio input. In some examples, the processor can apply a general time-frequency mask (TFM) speech model to generate the preprocessed audio.

At block 406, the processor detects an acoustic event corresponding to a disturbance in the preprocessed audio. For example, the processor can detect continuous events or impulsive events using the techniques described in FIG. 1.

At block 408, the processor selects a specific disturbance model based on the detected acoustic event. In some examples, the processor may also iteratively select additional specific disturbance models based on a detected additional disturbances in response to detecting the additional disturbances in the preprocessed audio or in the enhanced audio.

At block 410, the processor attenuates components related to the disturbance in the preprocessed audio using the selected specific disturbance model to generate an enhanced audio with suppressed noise. For example, the processor can process the preprocessed audio via a trained deep recurrent neural network. In some examples, the processor may apply an inferred time-frequency mask to the preprocessed audio. In various examples, the processor can apply and inferred disturbance time-frequency mask to the preprocessed audio.

At decision diamond 412, the processor determines whether any additional acoustic event is detected. If no additional acoustic event is detected, then the method may proceed at block 414. If an additional acoustic event is detected, then the method may proceed at block 408.

At block 414, the processor outputs the enhanced audio. For example, the enhanced audio may include speech with various specific disturbances removed.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation. For example, any of the additional processing described in FIG. 3 may also be included in the method 400. For example, the processor can generate comfort noise and adding the comfort noise to the enhanced audio to cover imperfections in a mask of the specific disturbance model. In some examples, the processor can also adjust an intensity of the attenuation in response to detecting a knob adjustment to preserve more speech or eliminate more noise.

Figure 5:
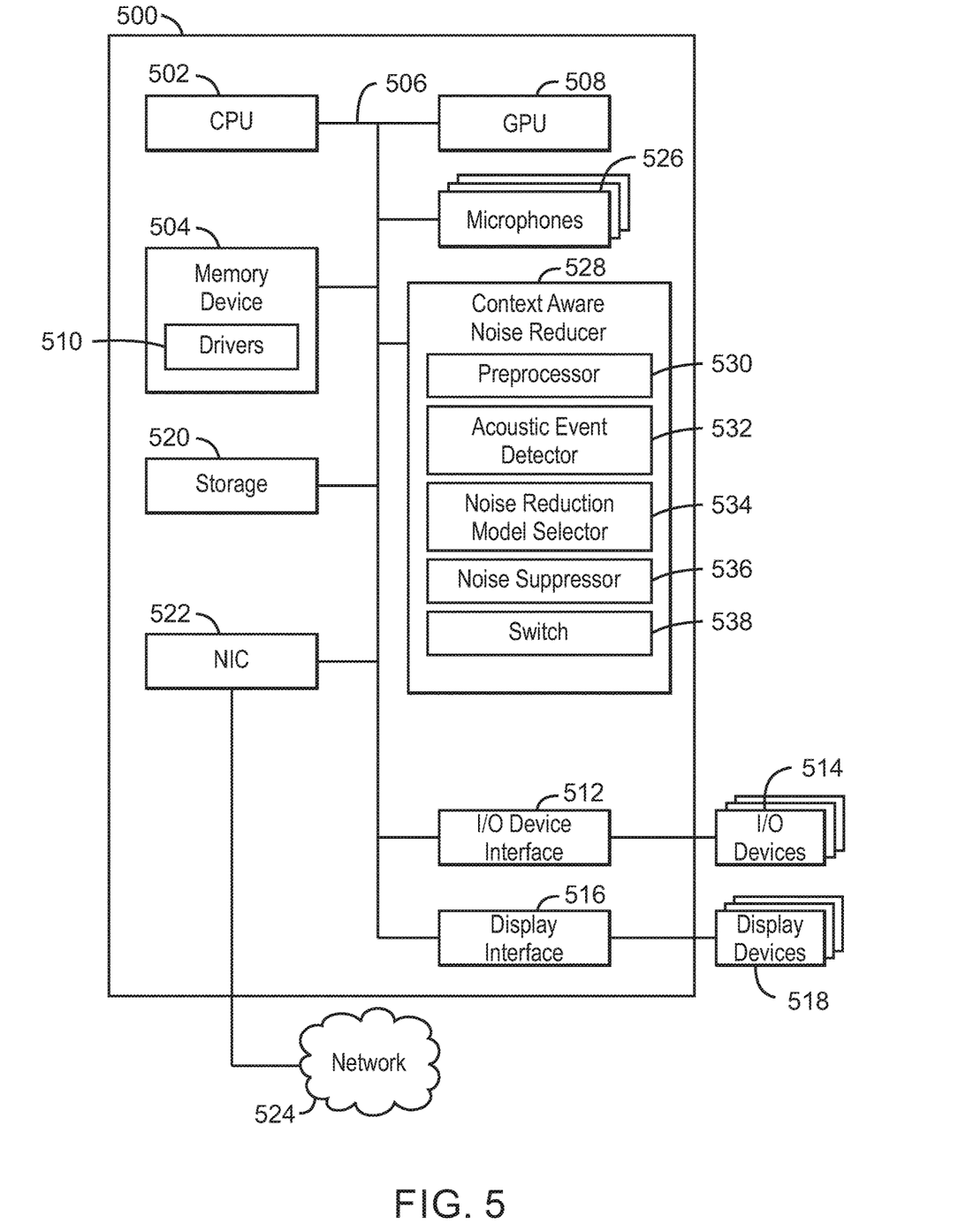
FIG. 5 is block diagram illustrating an example computing device that can reduce noise in audio using specific disturbance models.

Referring now to FIG. 5, a block diagram is shown illustrating an example computing device that can reduce noise in audio using specific disturbance models. The computing device 500 may be, for example, a laptop computer, desktop computer, tablet computer, mobile device, or wearable device, among others. In some examples, the computing device 500 may be a video conferencing device or a virtual assistant device. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for reducing noise in audio using specific disturbance models. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device 500 also includes a storage device 520. The storage device 520 is a physical memory such as a hard drive, an optical drive, a thumbdrive, an array of drives, a solid-state drive, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes microphones 526. For example, the microphones 526 may include one or more sound sensors. In some examples, the microphones 526 may include a processor to generate preprocessed audio.

The computing device 500 further includes a context aware noise reducer 528. For example, the context aware noise reducer 528 can be used to reduce noise in audio using specific disturbance models. The context aware noise reducer 528 can include a preprocessor 530, an acoustic event detector 532, a noise reduction model selector 534, a noise suppressor 536, and a switch 538. In some examples, each of the components 530-538 of the context aware noise reducer 528 may be a microcontroller, embedded processor, or software module. The preprocessor 530 can receive audio input from a microphone and preprocess the audio input to generate preprocessed audio. In various examples, the preprocessor 530 can perform reverb reduction, gain compensation, DC removal, beamforming of the audio input, or any combination thereof. The acoustic event detector 532 can detect an acoustic event corresponding to a disturbance in the preprocessed audio. In various examples, the acoustic event detector 532 may be a neural network-based spectral speech enhancement. In some examples, the acoustic event detector 532 may include an auto-encoder to perform a network-based time domain speech enhancement. In some examples, the acoustic event detector 532 may include a frontend to compute filterbank features in the frequency domain, a deep neural network, and a backend. In various examples, the acoustic event detector 532 may be a neural network classifier with convolutional layers. The noise reduction model selector 534 can select a specific disturbance model based on the detected acoustic event. The noise suppressor 536 can attenuate components related to the disturbance in the preprocessed audio using the selected specific disturbance model to generate an enhanced audio with suppressed noise. In some examples, the noise suppressor 536 may be a deep recurrent neural network with a recurrent layer. In various examples, the noise suppressor 536 may be a neural network trained to infer a speech time-frequency mask. In some examples, the noise suppressor 536 may be a neural network trained to infer a disturbance time-frequency mask. In some examples, the noise suppressor 536 may be a neural network including a skip connection between an input of the neural network and a last layer of the neural network. For example, the noise suppressor 536 may be the noise suppressor 300 of FIG. 3. The switch 538 can output the enhanced audio in response to detecting the acoustic event and output the preprocessed audio in response to detecting no acoustic event in the preprocessed audio.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. For example, the computing device 500 may include an automatic speech recognizer to recognize speech in the enhanced audio. In some examples, the computing device 500 may also include a natural language understanding unit trained to perform various actions in response to detecting speech in the enhanced audio. In various examples, the computing device 500 may also include a comfort noise generator that can generate comfort noise in the enhanced audio. For example, the comfort noise generator may generate comfort noise to cover imperfections in a mask of the specific disturbance model. Furthermore, any of the functionalities of the preprocessor 530, the acoustic event detector 532, and the noise reduction model selector 534, the noise suppressor 536, and the switch 538, may be partially, or entirely, implemented in hardware and/or in the processor 502. For example, the functionality may be implemented with an application specific integrated circuit, in logic implemented in the processor 502, or in any other device. In addition, any of the functionalities of the CPU 502 may be partially, or entirely, implemented in hardware and/or in a processor. For example, the functionality of the context aware noise reducer 528 may be implemented with an application specific integrated circuit, in logic implemented in a processor, in logic implemented in a specialized graphics processing unit such as the GPU 508, or in any other device.

Figure 6:
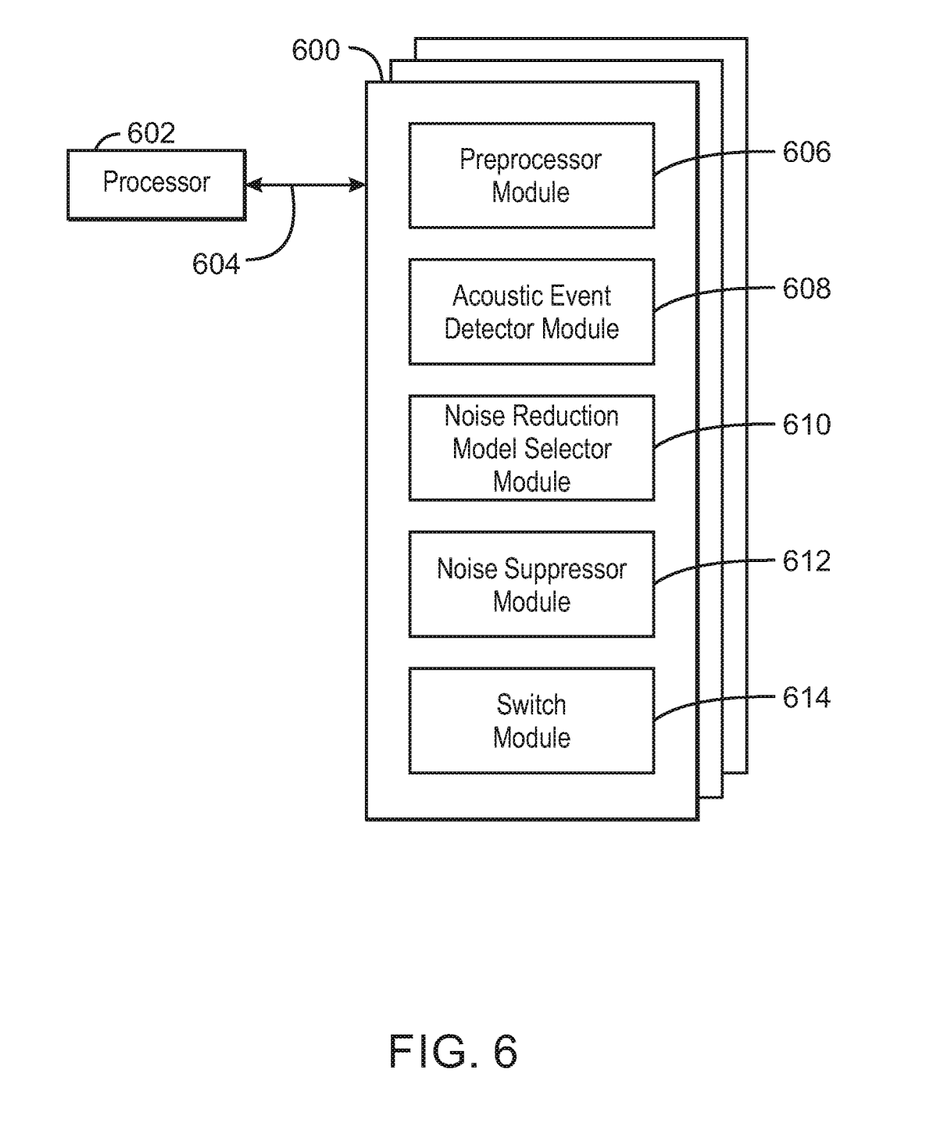
FIG. 6 is a block diagram showing computer readable media that store code for reducing noise in audio using specific disturbance models.

FIG. 6 is a block diagram showing computer readable media 600 that store code for reducing noise in audio using specific disturbance models. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, a preprocessor module 606 may be configured to receive audio input from a microphone and preprocess the audio input to generate preprocessed audio. An acoustic event detector module 608 may be configured to detect an acoustic event corresponding to a disturbance in the preprocessed audio. A noise reduction model selector module 610 may be configured to select a specific disturbance model based on the detected acoustic event. In some examples, the noise reduction model selector module 610 may be configured to iteratively select additional specific disturbance models based on one or more detected additional disturbances. For example, the noise reduction model selector module 610 may be configured to select an additional specific disturbance model in response to detecting an additional disturbance in the preprocessed audio or in enhanced audio from the noise suppressor module 612. A noise suppressor module 612 may be configured to attenuate components related to the disturbance in the preprocessed audio using the selected specific disturbance model to generate an enhanced audio with suppressed noise. In some examples, the noise suppressor module 612 may be configured to adjust an intensity of the attenuation in response to detecting a knob adjustment to preserve more speech or eliminate more noise. For example, an adjustment of the knob in one direction may indicate that less noise will be eliminated but more speech be preserved. An adjustment in the other direction may indicate that more noise is to be eliminated and less speech is to be preserved. A switch module 614 may be configured to output the enhanced audio in response to detecting no additional disturbance in the preprocessed audio. In some examples, the switch module 614 may be configured to output the preprocessed audio in response to detecting no disturbance in the preprocessed audio.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

EXAMPLES

Example 1 is an apparatus for reducing noise in audio. The apparatus includes a preprocessor to receive audio input from a microphone and preprocess the audio input to generate preprocessed audio. The apparatus also includes an acoustic event detector to detect an acoustic event corresponding to a disturbance in the preprocessed audio. The apparatus further includes a noise reduction model selector to select a specific disturbance model based on the detected acoustic event. The apparatus also further includes a noise suppressor to attenuate components related to the disturbance in the preprocessed audio using the selected specific disturbance model to generate an enhanced audio with suppressed noise.

Example 2 includes the apparatus of example 1, including or excluding optional features. In this example, the apparatus includes a switch to output the enhanced audio in response to detecting the acoustic event and output the preprocessed audio in response to detecting no acoustic event in the preprocessed audio.

Example 3 includes the apparatus of any one of examples 1 to 2, including or excluding optional features. In this example, the noise suppressor includes a deep recurrent neural network with a recurrent layer.

Example 4 includes the apparatus of any one of examples 1 to 3, including or excluding optional features. In this example, the noise suppressor includes a neural network trained to infer a speech time-frequency mask.

Example 5 includes the apparatus of any one of examples 1 to 4, including or excluding optional features. In this example, the noise suppressor includes a neural network including a skip connection between an input of the neural network and a last layer of the neural network.

Example 6 includes the apparatus of any one of examples 1 to 5, including or excluding optional features. In this example, the noise suppressor includes a neural network trained to infer a disturbance time-frequency mask.

Example 7 includes the apparatus of any one of examples 1 to 6, including or excluding optional features. In this example, the acoustic event detector includes a neural network-based spectral speech enhancement.

Example 8 includes the apparatus of any one of examples 1 to 7, including or excluding optional features. In this example, the acoustic event detector includes an autoencoder to perform a network-based time domain speech enhancement.

Example 9 includes the apparatus of any one of examples 1 to 8, including or excluding optional features. In this example, the acoustic event detector includes a frontend to compute filterbank features in the frequency domain, a deep neural network, and a backend.

Example 10 includes the apparatus of any one of examples 1 to 9, including or excluding optional features. In this example, the acoustic event detector includes a neural network classifier with convolutional layers.

Example 11 is a method for reducing noise in audio. The method includes receiving, via a processor, audio input from a microphone. The method also includes preprocessing, via the processor, the audio input to generate preprocessed audio. The method further includes detecting, via the processor, an acoustic event corresponding to a disturbance in the preprocessed audio. The method also further includes selecting, via the processor, a specific disturbance model based on the detected acoustic event. The method also includes attenuating, via the processor, components related to the disturbance in the preprocessed audio using the selected specific disturbance model to generate an enhanced audio with suppressed noise. The method further includes outputting, via the processor, the enhanced audio.

Example 12 includes the method of example 11, including or excluding optional features. In this example, the method includes iteratively selecting additional specific disturbance models based on a detected additional disturbances in response to detecting the additional disturbances in the preprocessed audio or the enhanced audio.

Example 13 includes the method of any one of examples 11 to 12, including or excluding optional features. In this example, outputting the enhanced audio includes detecting no additional disturbance in the preprocessed audio and outputting the enhanced audio in response to detecting no additional disturbance.

Example 14 includes the method of any one of examples 11 to 13, including or excluding optional features. In this example, the method includes outputting the preprocessed audio in response to detecting no disturbance in the preprocessed audio.

Example 15 includes the method of any one of examples 11 to 14, including or excluding optional features. In this example, the method includes adjusting an intensity of the attenuation in response to detecting a knob adjustment to preserve more speech or eliminate more noise.

Example 16 includes the method of any one of examples 11 to 15, including or excluding optional features. In this example, attenuating the components related to the disturbance includes processing the preprocessed audio via a trained deep recurrent neural network.

Example 17 includes the method of any one of examples 11 to 16, including or excluding optional features. In this example, attenuating the components related to the disturbance includes applying an inferred time-frequency mask to the preprocessed audio.

Example 18 includes the method of any one of examples 11 to 17, including or excluding optional features. In this example, the method includes generating comfort noise and adding the comfort noise to the enhanced audio to cover imperfections in a mask of the specific disturbance model.

Example 19 includes the method of any one of examples 11 to 18, including or excluding optional features. In this example, preprocessing the audio input includes applying a general time-frequency mask (TFM) speech model.

Example 20 includes the method of any one of examples 11 to 19, including or excluding optional features. In this example, preprocessing the audio input includes performing gain, DC removal, and beamforming of the audio input, wherein the audio input is received from a number of microphones.

Example 21 is at least one computer readable medium for reducing noise in audio having instructions stored therein that direct the processor to receive audio input from a microphone and preprocess the audio input to generate preprocessed audio. The computer-readable medium includes instructions that direct the processor to detect an acoustic event corresponding to a disturbance in the preprocessed audio. The computer-readable medium also includes instructions that direct the processor to select a specific disturbance model based on the detected acoustic event. The computer-readable medium further includes instructions that direct the processor to attenuate components related to the disturbance in the preprocessed audio using the selected specific disturbance model to generate an enhanced audio with suppressed noise.

Example 22 includes the computer-readable medium of example 21, including or excluding optional features. In this example, the computer-readable medium includes instructions that cause the processor to iteratively select additional specific disturbance models based on a detected additional disturbance in response to detecting the additional disturbances in the preprocessed audio.

Example 23 includes the computer-readable medium of any one of examples 21 to 22, including or excluding optional features. In this example, the computer-readable medium includes instructions that cause the processor to output the enhanced audio in response to detecting no additional disturbance in the preprocessed audio.

Example 24 includes the computer-readable medium of any one of examples 21 to 23, including or excluding optional features. In this example, the computer-readable medium includes instructions that cause the processor to output the preprocessed audio in response to detecting no disturbance in the preprocessed audio.

Example 25 includes the computer-readable medium of any one of examples 21 to 24, including or excluding optional features. In this example, the computer-readable medium includes instructions that cause the processor to adjust an intensity of the attenuation in response to detecting a knob adjustment to preserve more speech or eliminate more noise.

Example 26 includes the computer-readable medium of any one of examples 21 to 25, including or excluding optional features. In this example, the computer-readable medium includes instructions to process the preprocessed audio via a trained deep recurrent neural network.

Example 27 includes the computer-readable medium of any one of examples 21 to 26, including or excluding optional features. In this example, the computer-readable medium includes instructions to apply an inferred time-frequency mask to the preprocessed audio.

Example 28 includes the computer-readable medium of any one of examples 21 to 27, including or excluding optional features. In this example, the computer-readable medium includes instructions to generate comfort noise and add the comfort noise to the enhanced audio to cover imperfections in a mask of the specific disturbance model.

Example 29 includes the computer-readable medium of any one of examples 21 to 28, including or excluding optional features. In this example, the computer-readable medium includes instructions to apply a general time-frequency mask (TFM) speech model.

Example 30 includes the computer-readable medium of any one of examples 21 to 29, including or excluding optional features. In this example, the computer-readable medium includes instructions to perform gain, DC removal, and beamforming of the audio input, wherein the audio input is received from a number of microphones.

Example 31 is a system for reducing noise in audio. The system includes a preprocessor to receive audio input from a microphone and preprocess the audio input to generate preprocessed audio. The system also includes an acoustic event detector to detect an acoustic event corresponding to a disturbance in the preprocessed audio. The system further includes a noise reduction model selector to select a specific disturbance model based on the detected acoustic event. The system also includes a noise suppressor to attenuate components related to the disturbance in the preprocessed audio using the selected specific disturbance model to generate an enhanced audio with suppressed noise.

Example 32 includes the system of example 31, including or excluding optional features. In this example, the system includes a switch to output the enhanced audio in response to detecting the acoustic event and output the preprocessed audio in response to detecting no acoustic event in the preprocessed audio.

Example 33 includes the system of any one of examples 31 to 32, including or excluding optional features. In this example, the noise suppressor includes a deep recurrent neural network with a recurrent layer.

Example 34 includes the system of any one of examples 31 to 33, including or excluding optional features. In this example, the noise suppressor includes a neural network trained to infer a speech time-frequency mask.

Example 35 includes the system of any one of examples 31 to 34, including or excluding optional features. In this example, the noise suppressor includes a neural network including a skip connection between an input of the neural network and a last layer of the neural network.

Example 36 includes the system of any one of examples 31 to 35, including or excluding optional features. In this example, the noise suppressor includes a neural network trained to infer a disturbance time-frequency mask.

Example 37 includes the system of any one of examples 31 to 36, including or excluding optional features. In this example, the acoustic event detector includes a neural network-based spectral speech enhancement.

Example 38 includes the system of any one of examples 31 to 37, including or excluding optional features. In this example, the acoustic event detector includes an autoencoder to perform a network-based time domain speech enhancement.

Example 39 includes the system of any one of examples 31 to 38, including or excluding optional features. In this example, the acoustic event detector includes a frontend to compute filterbank features in the frequency domain, a deep neural network, and a backend.

Example 40 includes the system of any one of examples 31 to 39, including or excluding optional features. In this example, the acoustic event detector includes a neural network classifier with convolutional layers.

Example 41 is a system for reducing noise in audio. The system includes means for preprocessing received audio input from a microphone to generate preprocessed audio.

The system also includes means for detecting an acoustic event corresponding to a disturbance in the preprocessed audio. The system further includes means for selecting a specific disturbance model based on the detected acoustic event. The system also further includes means for attenuating components related to the disturbance in the preprocessed audio using the selected specific disturbance model to generate an enhanced audio with suppressed noise.

Example 42 includes the system of example 41, including or excluding optional features. In this example, the system includes means for outputting the enhanced audio in response to detecting the acoustic event and output the preprocessed audio in response to detecting no acoustic event in the preprocessed audio.

Example 43 includes the system of any one of examples 41 to 42, including or excluding optional features. In this example, the means for attenuating the components includes a deep recurrent neural network with a recurrent layer.

Example 44 includes the system of any one of examples 41 to 43, including or excluding optional features. In this example, the means for attenuating the components includes a neural network trained to infer a speech time-frequency mask.

Example 45 includes the system of any one of examples 41 to 44, including or excluding optional features. In this example, the means for attenuating the components includes a neural network including a skip connection between an input of the neural network and a last layer of the neural network.

Example 46 includes the system of any one of examples 41 to 45, including or excluding optional features. In this example, the means for attenuating the components includes a neural network trained to infer a disturbance time-frequency mask.

Example 47 includes the system of any one of examples 41 to 46, including or excluding optional features. In this example, the means for detecting the acoustic event includes a neural network-based spectral speech enhancement.

Example 48 includes the system of any one of examples 41 to 47, including or excluding optional features. In this example, the means for detecting the acoustic event includes an auto-encoder to perform a network-based time domain speech enhancement.

Example 49 includes the system of any one of examples 41 to 48, including or excluding optional features. In this example, the means for detecting the acoustic event includes a frontend to compute filterbank features in the frequency domain, a deep neural network, and a backend.

Example 50 includes the system of any one of examples 41 to 49, including or excluding optional features. In this example, the means for detecting the acoustic event includes a neural network classifier with convolutional layers.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
a deep recurrent neural network, implemented by at least one of (a) one or more processor circuits programmed by instructions or (b) circuitry, to:
generate a vector based on first audio, the vector to include coordinates corresponding to types of sounds at different portions of the first audio; and
generate a disturbance time-frequency mask based on the vector, the disturbance time-frequency mask to include scores for corresponding ones of the coordinates, a first score of the scores indicative of a first sound type corresponding to a first time-frequency component of the first audio, the first sound type different from a second sound type corresponding to a second time-frequency component of the first audio;
a mask filter to generate a filtered disturbance time-frequency mask by:
applying a median filter to the disturbance time-frequency mask in time between consecutive frames;
applying the median filter to the disturbance time-frequency mask in frequency between consecutive bins; and
comparing values of the disturbance time-frequency mask to a threshold to remove errors from the disturbance time-frequency mask;
a mask applicator, implemented by the at least one of (a) the one or more processor circuits programmed by the instructions or (b) the circuitry, to multiply the filtered disturbance time-frequency mask by an input spectrum corresponding to the first audio to generate preprocessed audio, the preprocessed audio to include the first sound type and the second sound type;
a noise reduction model selector, implemented by the at least one of (a) the one or more processor circuits programmed by the instructions or (b) the circuitry, to select a first disturbance model based on the first sound type in the preprocessed audio at the first time-frequency component and select a second disturbance model based on the second sound type in the preprocessed audio at the second time-frequency component; and a noise suppressor, implemented by the at least one of (a) the one or more processor circuits programmed by the instructions or (b) the circuitry, to generate second audio by:
attenuating a first sound corresponding to the first sound type in the preprocessed audio using the first disturbance model; and
applying the second disturbance model to attenuate a second sound corresponding to the second sound type in the first preprocessed audio.

2. The apparatus of claim 1, including a switch to output the second audio and output third audio that bypasses the noise suppressor after no acoustic event is detected in the third audio.

3. The apparatus of claim 1, including a second deep recurrent neural network with a recurrent layer, the second deep recurrent neural network implemented by the at least one of (a) the one or more processor circuits programmed by the instructions or (b) the circuitry.

4. The apparatus of claim 1, including a second neural network trained to infer a speech time-frequency mask, the second neural network implemented by the at least one of (a) the one or more processor circuits programmed by the instructions or (b) the circuitry.

5. The apparatus of claim 1, including a skip connection between an input terminal of a neural network and a last layer of the neural network.

6. The apparatus of claim 1, including an acoustic event detector, implemented by the at least one of (a) the one or more processor circuits programmed by the instructions or (b) the circuitry, to detect the first sound type in the preprocessed audio.

7. The apparatus of claim 6, including a neural network-based spectral speech enhancement.

8. The apparatus of claim 6, including an auto-encoder, implemented by the at least one of (a) the one or more processor circuits programmed by the instructions or (b) the circuitry, to perform a network-based time domain speech enhancement.

9. The apparatus of claim 6, wherein the acoustic event detector includes a frontend to compute filterbank features in at least one of a frequency domain, a deep neural network, or a backend.

10. The apparatus of claim 6, wherein the acoustic event detector includes a neural network classifier with convolutional layers.

11. An apparatus comprising:
interface circuitry;
instructions; and
at least one processor circuit to be programmed by the instructions to:
generate a vector based on first audio, the vector to include coordinates corresponding to types of sounds at different portions of the first audio;
generate a disturbance time-frequency mask based on the vector, the disturbance time-frequency mask to include scores for corresponding ones of the coordinates, a first score of the scores indicative of a first sound type corresponding to a first time-frequency component of the first audio, the first sound type different from a second sound type corresponding to a second time-frequency component of the first audio;
generate a filtered disturbance time-frequency mask by:
applying a filter to the disturbance time-frequency mask in time between consecutive frames;
applying the filter to the disturbance time-frequency mask in frequency between consecutive bins; and
comparing values of the disturbance time-frequency mask to a threshold to remove errors from the disturbance time-frequency mask;
multiply the filtered disturbance time-frequency mask by an input spectrum corresponding to the first audio to generate preprocessed audio, the preprocessed audio to include the first sound type and the second sound type;
select a first disturbance model based on the first sound type in the preprocessed audio at the first time-frequency component;
select a second disturbance model based on the second sound type in the preprocessed audio at the second time-frequency component; and
generate second audio by:
attenuating a first sound corresponding to the first sound type in the preprocessed audio using the first disturbance model; and
applying the second disturbance model to attenuate a second sound corresponding to the second sound type in the preprocessed audio; and
cause outputting of the second audio.

12. The apparatus of claim 11, wherein one or more of the at least one processor circuit is to iteratively select additional specific disturbance models based on disturbances in the preprocessed audio or the second audio.

13. The apparatus of claim 11, wherein one or more of the at least one processor circuit is to output the second audio after no disturbance is detected in the preprocessed audio.

14. The apparatus of claim 11, wherein one or more of the at least one processor circuit is to output third audio that bypasses a noise suppressor after no disturbance is detected in the third audio.

15. The apparatus of claim 11, wherein one or more of the at least one processor circuit is to apply the second disturbance model to attenuate the second sound based on a knob adjustment.

16. The apparatus of claim 11, wherein one or more of the at least one processor circuit is to attenuate at least one of the first sound or a foreground human sound by processing the preprocessed audio via a trained deep recurrent neural network.

17. The apparatus of claim 11, wherein one or more of the at least one processor circuit is to attenuate at least one of the first sound or a foreground human sound by applying an inferred time-frequency mask to the preprocessed audio.

18. The apparatus of claim 11, wherein one or more of the at least one processor circuit is to generate comfort noise and add the comfort noise to the second audio to cover imperfections in a mask of the first disturbance model.

19. The apparatus of claim 11, wherein one or more of the at least one processor circuit is to generate the preprocessed audio by applying a general time-frequency mask (TFM) speech model.

20. The apparatus of claim 11, wherein one or more of the at least one processor circuit is to generate the preprocessed audio by performing at least one of gain, DC removal, or beamforming of the first audio, wherein the first audio is from a plurality of microphones.

21. At least one storage device or storage disk comprising instructions to cause one or more programmable circuits to at least:
  generate a vector based on first audio, the vector to include coordinates corresponding to types of sounds at different portions of the first audio;
  generate a disturbance time-frequency mask based on the vector, the disturbance time-frequency mask to include scores for corresponding ones of the coordinates, a first score of the scores indicative of a first sound type corresponding to a first time-frequency component of the first audio, the first sound type different from a second sound type corresponding to a second time-frequency component of the first audio;
  generate a filtered disturbance time-frequency mask by:
    applying a median filter to the disturbance time-frequency mask in time between consecutive frames;
    applying the median filter to the disturbance time-frequency mask in frequency between consecutive bins; and
    comparing values of the disturbance time-frequency mask to a threshold to remove errors from the disturbance time-frequency mask;
  multiply the filtered disturbance time-frequency mask by an input spectrum corresponding to the first audio to generate preprocessed audio, the preprocessed audio to include the first sound type and the second sound type;
  select a first disturbance model based on the sound type in the first preprocessed audio at the first time-frequency component;
  select a second disturbance model based on the second sound type in the preprocessed audio at the second time-frequency component; and
  generate enhanced audio by:
    attenuating a first sound corresponding to the first sound type using the first disturbance model; and
    applying the second disturbance model to attenuate a second sound corresponding to the second sound type in the preprocessed audio.

22. The at least one storage device or storage disk of claim 21, wherein the instructions are to cause at least one of the one or more programmable circuits to iteratively select additional disturbance models based on acoustic events detected in the preprocessed audio or the enhanced audio.

23. The at least one storage device or storage disk of claim 21, wherein the instructions are to cause at least one of the one or more programmable circuits to output the enhanced audio after an acoustic event is not detected.

24. The at least one storage device or storage disk of claim 21, wherein the instructions are to cause at least one of the one or more programmable circuits to output audio that bypasses a noise suppressor after no disturbance is detected in the preprocessed audio.

25. The at least one storage device or storage disk of claim 21, wherein the instructions are to cause at least one of the one or more programmable circuits to generate the enhanced audio by attenuating a first foreground human sound exclusive of a second foreground human sound based on: (1) identifying a third time-frequency component of the first foreground human sound with a first value, and (2) identifying a fourth time-frequency component of the second foreground human sound with a second value different from the first value.

26. The apparatus of claim 1, wherein the mask filter is to:
  use a filter kernel size of the median filter as a tuning parameter for the median filter; and
  remove the errors from the disturbance time-frequency mask by setting at least some of the values of the disturbance time-frequency mask to zero based on the comparing of the values to the threshold.

* * * * *

UNITED STATES PATENT AND TRADEMARK OFFICE
CERTIFICATE OF CORRECTION

PATENT NO. : 12,211,512 B2
APPLICATION NO. : 16/786471
DATED : January 28, 2025
INVENTOR(S) : Adam Kupryjanow, Kuba Lopatka and Tomasz Szmelczynski Page 1 of 1

It is certified that error appears in the above-identified patent and that said Letters Patent is hereby corrected as shown below:

In the Claims

In Column 19, Claim 1, Line 17, delete "first preprocessed" and insert --preprocessed--

In Column 21, Claim 21, Line 28, delete "the sound type" and insert --the first sound type--

In Column 21, Claim 21, Line 29, delete "first preprocessed" and insert --preprocessed--

Signed and Sealed this
Eleventh Day of March, 2025

Coke Morgan Stewart
*Acting Director of the United States Patent and Trademark Office*